United States Patent [19]

Ladwig

[11] Patent Number: 5,460,275
[45] Date of Patent: Oct. 24, 1995

[54] SPARKLING CD/CASSETTE HOLDER

[76] Inventor: Gregory J. Ladwig, 5804 Tudor Dr., Madison, Wis. 53711

[21] Appl. No.: 209,971

[22] Filed: Mar. 14, 1994

[51] Int. Cl.[6] ............................................ A47F 7/00
[52] U.S. Cl. ............................... 211/40; 211/41; 312/9.9; 312/223.5
[58] Field of Search .................... 211/40, 41, 163, 211/1.51, 26; 312/9.9, 9.47, 9.53, 9.55, 223.5; 206/309, 387

[56] References Cited

U.S. PATENT DOCUMENTS

| | | | |
|---|---|---|---|
| 3,684,344 | 8/1972 | Gillinger | 312/223.5 |
| 3,786,931 | 1/1974 | Householder | 312/9.9 X |
| 4,231,625 | 11/1980 | Perez et al. | 312/245 |
| 4,939,625 | 7/1990 | Olson | 312/223.5 X |
| 5,163,745 | 11/1992 | Zagata | 312/223.5 X |
| 5,205,638 | 4/1993 | Squitieri | 312/223.5 X |
| 5,341,943 | 8/1994 | Fraser | 312/9.9 X |

OTHER PUBLICATIONS

Author: Unknown, Hammacher Schlemmer Catalog, Fall of '93, p. 51

*Primary Examiner*—Robert W. Gibson, Jr.
*Attorney, Agent, or Firm*—Robert J. Harter

[57] ABSTRACT

A holder for compact discs (CDs) or tape cassettes includes back lighting provided by a staggered pattern of discrete points of light. A surprisingly unusual effect occurs as the light shines through the clear plastic cases of the CDs or cassettes. As viewed from the front, the cases appear to sparkle with light.

20 Claims, 2 Drawing Sheets

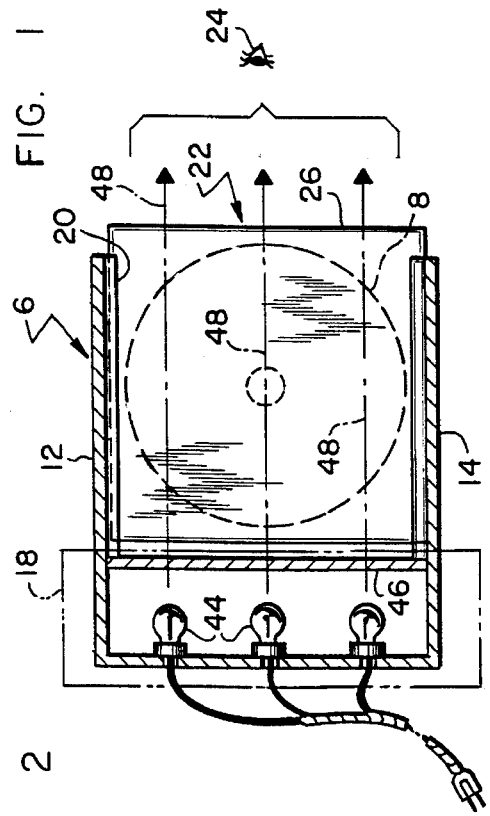
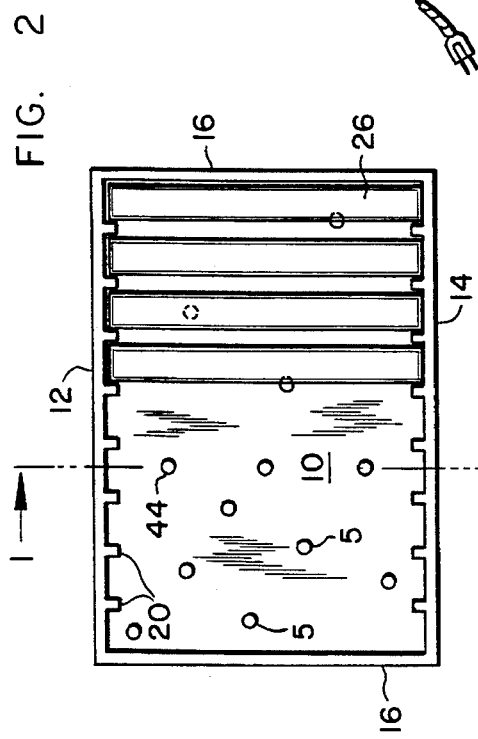
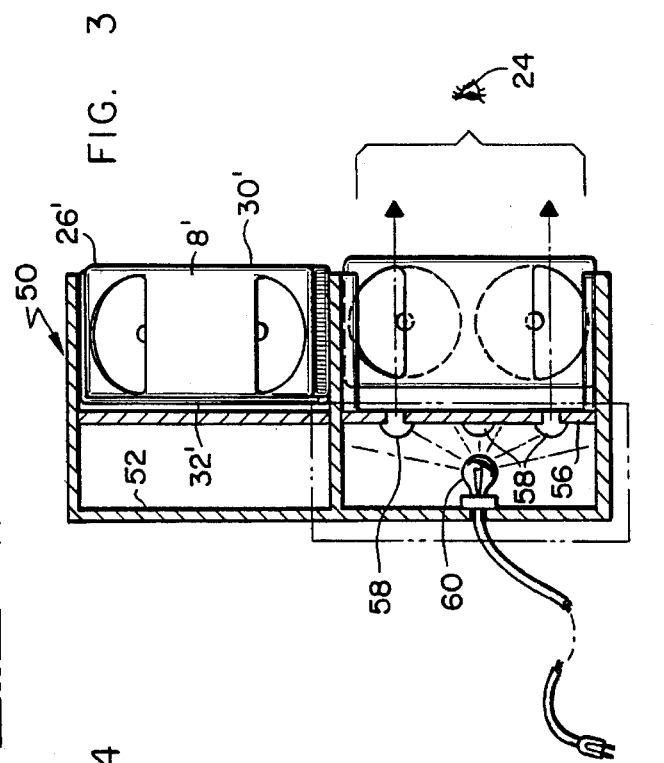
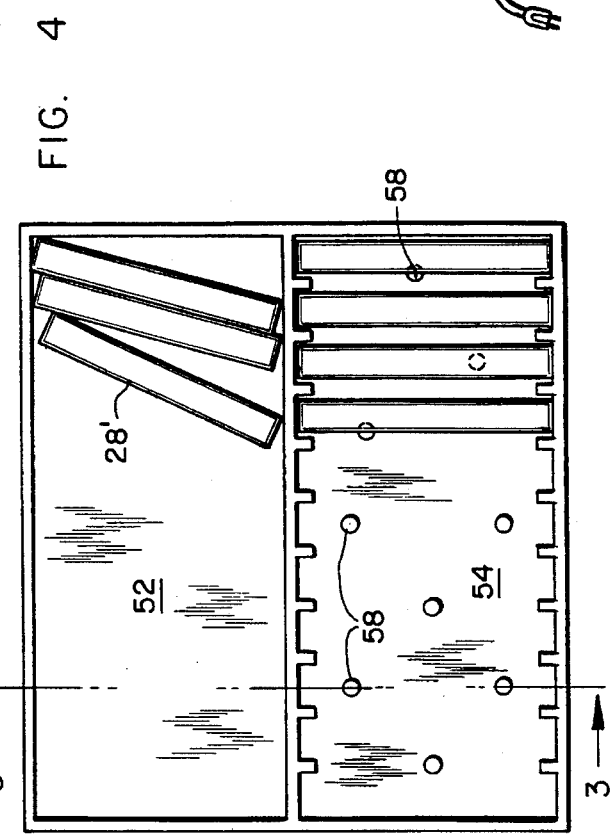

SPARKLING CD/CASSETTE HOLDER

BACKGROUND OF THE INVENTION

1. Field of the Invention

The subject invention generally pertains to compact disc and cassette holders, and more specifically to one with back lighting.

2. Description of Related Art

Conventional compact disc and cassette holders have no back lighting whatsoever.

To offer a unique way of storing and displaying compact discs and cassettes, it's an object of the invention to provide only back lighting of the compact discs or cassettes.

Another object is to size a CD or cassette storage compartment so that, when filled, substantially all the back lighting is obstructed or diffused by the see-through plastic containers of the compact discs or cassettes.

Another object is to provide back lighting by way of numerous discrete points of light that are spaced apart from each other.

Another object is to randomly stagger the points of light.

These and other objects of the invention are provided by a novel CD or cassette holder with back lighting provided by several discrete points of light that are staggered both vertically and horizontally.

BRIEF DESCRIPTION OF THE DRAWINGS

FIG. 1 shows a cross-sectional side view of holder for compact discs.

FIG. 2 shows a front view of the holder of FIG. 1.

FIG. 3 shows a cross-sectional side view of a two-compartment holder for tape cassettes.

FIG. 4 shows a front view of the holder of FIG. 3.

DESCRIPTION OF THE PREFERRED EMBODIMENT

Figure 5:
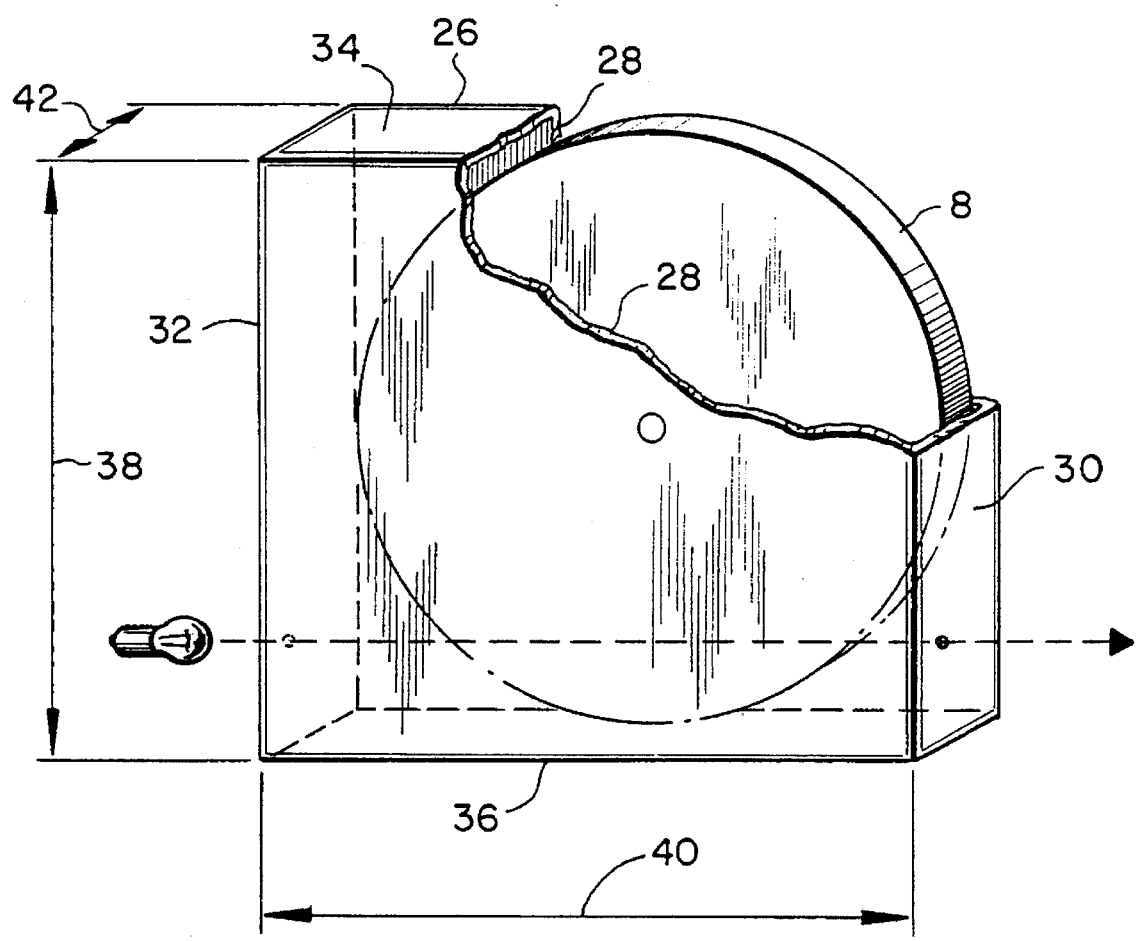
FIG. 5 shows a schematic perspective cutaway of a compact disc case.

FIG. 1 shows an illuminated holder 6 for compact discs 8 (information storage device). Holder 6 has a single retainer 10, where in one embodiment, retainer 10 includes a top 12, a bottom 14, two flank sides 16, and a back side 18. Top 12 and bottom 14 include ribs 20 to help prevent compact discs 8 from tipping over. Opposite back side 18 is a viewing side 22 as seen by an eye 24. Viewing side 22 also provides an access through which the cases of discs 8 can be inserted and removed.

FIG. 5 shows a cut-away view of a conventional see-through plastic case 26 for compact disc 8. Case 26 includes two sides 28, a front edge 30 (associated with a label identifying its contents), a back edge 32, a top edge 34 and a bottom edge 36. For a CD (compact disc), case dimensions 38, 40 and 42 are approximately 4.9 in., 5.6 in., and 0.4 in., respectively. Such a case is often referred to as a "jewel case." For a tape cassette, the corresponding dimensions would be approximately 4.3 in., 2.8 in., and 0.7 in., respectively.

Referring back to FIG. 1 and also FIG. 2, several light bulbs 44 (plurality of light spots), e.g., light emitting diode 5, associated with back side 18 are staggered and spaced apart in both vertical and horizontal directions. A transparent plate 46 separate bulbs 44 from compact discs 8. As indicated by light beam arrows 48, bulbs 44 project light through plate 46, through back edge 32, through side 28, out through front edge 30, and toward viewing eye 24.

FIGS. 3 and 4 show an illuminating holder 50 with two retainers 52 and 54. In this embodiment, transparent plate 46 of FIG. 1 is replaced by an opaque plate 56 having several staggered and spaced apart lens 58 (plurality of light spots). The light source is provided by a single bulb 60. Bulb 60 projects light through lens 58, through back edge 32', through side 28', and out through front edge 30', and toward viewing eye 24.

Back edge 32', side 28', and front edge 30' are the parts of a cassette tape case 26' that basically correspond to back edge 32, side 28, and front edge 30 of compact disc case 26. It should be appreciated that the embodiments of FIGS. 1 and 3 can be readily adapted to use with either compact discs 8, cassette tapes 8', or other similar see-through case housing an information storage device.

In one embodiment of the invention, lens 58 are of different colors. In another embodiment, conventional Christmas tree lights were used to provide bulbs 44 of different colors. In another embodiment, lights 44 blinked on and off.

Although the invention is described with respect to a preferred embodiment, modifications thereto will be apparent to those skilled in the art. Therefore, the scope of the invention is to be determined by reference to the claims which follow:

I claim:

1. An illuminating holder for a plurality of see-through cases each housing an information storage device such as an audio cassette or a compact disc, each of said see-through cases having two sides and four edges including a front edge and a back edge opposite said front edge, said front edge having a label associated therewith, said illuminating holder being adapted to hold said plurality of see-through cases substantially aligned in side-by-side relationship to display said front edge of each of said plurality of see-through cases, said illuminating holder comprising:

a retainer specifically for holding said plurality of see-through cases, said retainer defining an access extending across said front edge of each of said plurality of see-through cases when said plurality of see-through cases are substantially aligned in side-by-side relationship in said retainer, said access being adapted to provide a view of said front edge of each of said plurality of see-through cases, said access providing a means for removing and inserting said plurality of see-through cases into and out of said retainer; and a lighted side on said retainer, said lighted side being associated with a light source adapted to project light from a plurality of discrete spaced apart light spots, into said back edge, through at least one of said two sides, and out of at least one said front edge.

2. The holder of claim 1, further comprising a plurality of ribs on said retainer for preventing said plurality of said see-through cases from tipping over when said retainer is only partially filled.

3. The holder of claim 1, wherein said plurality of discrete spaced apart light spots are provided by a corresponding plurality of light emitting diodes.

4. The holder of claim 1, wherein said plurality of discrete spaced apart light spots are spaced apart in at least two directions.

5. The holder of claim 1, wherein said plurality of discrete spaced apart light spots is provided by a corresponding plurality of light sources.

6. The holder of claim 1, wherein said plurality of discrete spaced apart light spots is provided by a plurality of lens associated with a quantity of light sources that is fewer than the quantity of said plurality of lens.

7. The holder of claim 1, wherein said plurality of discrete spaced apart light spots are of multiple colors.

8. The holder of claim 1, wherein said plurality of discrete spaced apart light spots are adapted to blink on and off.

9. The holder of claim 1, wherein said retainer includes two flank sides, a bottom, and a top all of which are connected to said back side.

10. An illuminating holder for a plurality of see-through cases each having an information storage device such as an audio cassette or a compact disc, each of said see-through cases having two sides and four edges including a front edge and a back edge opposite said front edge, said front edge having a label associated therewith, said illuminating holder being adapted to hold said plurality of see-through cases substantially aligned in side-by-side relationship to display said front edge of each of said plurality of see-through cases, said illuminating holder comprising:

a retainer specifically for holding said plurality of see-through cases, said retainer defining an access extending across said front edge of each of said plurality of see-through cases when said plurality of see-through cases are substantially aligned in side-by-side relationship in said retainer, said access being adapted to provide a view of said front edge of each of said plurality of see-through cases, said access providing a means for removing and inserting said plurality of see-through cases into and out of said retainer;

a plurality of ribs on said retainer for preventing said plurality of said see-through cases from tipping over when said retainer is only partially filled; and a lighted side on said retainer, said lighted side being associated with a plurality of discrete spaced apart light spots adapted to project light into at least one said back edge, through at least one of said two sides and out at least one of said front edge.

11. The holder of claim 10, wherein said plurality of discrete spaced apart light spots are spaced apart in at least two directions.

12. The holder of claim 10, wherein said plurality of discrete spaced apart light spots is provided by a plurality of light sources.

13. The holder of claim 10, wherein said plurality of discrete spaced apart light spots is provided by a plurality of lens associated with a quantity of light sources that is fewer than the quantity of said plurality of lens.

14. The holder of claim 10, wherein said plurality of discrete spaced apart light spots are of multiple colors.

15. The holder of claim 10, wherein said retainer includes two flank sides, a bottom, and a top all of which are connected to said back side.

16. A method of illuminating a plurality of see-through cases comprising the steps of:

positioning said plurality of see-through cases side-by-side in a retainer, each of said see-through cases housing a data storage device and each having two sides and four edges including a front edge and a back edge opposite said front edge; and projecting a plurality of discrete spaced apart light beams through said plurality of see-through cases so that said plurality of discrete spaced apart light beams travel away from said retainer in a direction from said back edges to said front edges of said plurality of see-through cases.

17. The method of claim 16, wherein said retainer includes a plurality of ribs for preventing said plurality of said see-through cases from tipping over.

18. The method of claim 16, wherein said plurality of discrete spaced apart light beams are spaced apart in at least two directions.

19. The method of claim 16, wherein said plurality of discrete spaced apart light beams are distinguishable by way of color.

20. The method of claim 16, wherein said plurality of discrete spaced apart light beams come from a single light source.

* * * * *